(12) United States Patent
Abe

(10) Patent No.: US 6,985,306 B2
(45) Date of Patent: Jan. 10, 2006

(54) PHOTOGRAPHING LENS

(75) Inventor: Yasuhiko Abe, Toda (JP)

(73) Assignee: Nidec Copal Corporation, Tokyo (JP)

(*) Notice: Subject to any disclaimer, the term of this patent is extended or adjusted under 35 U.S.C. 154(b) by 0 days.

(21) Appl. No.: 10/748,590

(22) Filed: Dec. 29, 2003

(65) Prior Publication Data
US 2004/0141242 A1 Jul. 22, 2004

(30) Foreign Application Priority Data
Dec. 27, 2002 (JP) ............ 2002-379642

(51) Int. Cl.
G02B 13/18 (2006.01)
G02B 9/12 (2006.01)
G02B 13/04 (2006.01)

(52) U.S. Cl. .......... 359/716; 359/792; 359/753

(58) Field of Classification Search .......... 359/644, 359/645, 713–718, 689, 784, 786, 792, 771, 359/772, 774, 741, 747, 748, 753
See application file for complete search history.

(56) References Cited

U.S. PATENT DOCUMENTS 4,060,306 A * 11/1977 Swaminathan ............ 359/792
5,701,475 A * 12/1997 Sugawara .................. 359/644
6,728,047 B2 * 4/2004 Sato et al. ................. 359/786

FOREIGN PATENT DOCUMENTS

| JP | 05-040220 A1 | 2/1993 |
| JP | 05-157962 A1 | 6/1993 |
| JP | 2000-171697 A1 | 6/2000 |
| JP | 2001-133684 A1 | 5/2001 |
| JP | 2002-098888 A1 | 4/2002 |
| JP | 2002-162561 A1 | 6/2002 |

OTHER PUBLICATIONS

Patent Abstracts of Japan for JP2002-162561 published on Jun. 7, 2002.
Patent Abstracts of Japan for JP2002-098888 published on Apr. 5, 2002.
Patent Abstracts of Japan for JP2001-133684 published on May 18, 2001.
Patent Abstracts of Japan for JP2000-171697 published on Jun. 23, 2000.
Patent Abstracts of Japan for JP05-157962 published on Jun. 25, 1993.
Patent Abstracts of Japan for JP05-040220 published on Feb. 19, 1993.

* cited by examiner

Primary Examiner—Georgia Epps
Assistant Examiner—Jack Dinh
(74) Attorney, Agent, or Firm—Darby & Darby

(57) ABSTRACT

The photographing lens of the present invention includes, starting from the object side: an aperture stop having a predetermined aperture; a first lens group having a positive overall refractive power; a second lens group having a positive overall refractive power; and a third lens group having a positive overall refractive power. The first lens group is a cemented lens with, from the object side, a first lens with a positive refractive power and a second lens with a negative refractive power. The second lens group includes a third lens with a positive refractive power and at least one aspherical surface. The third lens group includes a fourth lens with a positive refractive power and at least one aspherical surface. The present invention provides a thin photographing lens for mobile devices with cameras, which has a short total length and an exit angle up to around 20° and corrects various aberrations.

19 Claims, 4 Drawing Sheets

PHOTOGRAPHING LENS

FIELD OF THE INVENTION

The present invention relates to a photographing lens used with cameras in mobile devices such as portable telephones, portable information terminals, and other devices equipped with an imaging element such as a CCD, digital still cameras, and video cameras.

BACKGROUND OF THE INVENTION

An example of a photographing lens used with imaging elements such as CCDs is a photographing lens used for capturing video such as with monitoring cameras, which are primarily used to capture video. Since the pixel count in the imaging element is relatively low, the lens itself does not need to have high-quality optical properties.

The image quality of imaging elements used in conventional monitoring cameras and video cameras is generally inferior compared to the image quality of cameras using silver halide film. With recent advances in imaging element technology, however, the image quality of conventional monitoring cameras and video cameras has approached the image quality of silver halide film cameras. With recent increases in compactness and density now possible in imaging elements, there is a need for a photographing lens that provides high performance and that is also compact, thin, and inexpensive.

In photographing lenses used in devices such as portable telephones and portable information terminals (PDAs), the lens design is very compact and thin and is limited to roughly one or two lenses. However, the lenses are designed for relatively low pixel densities of approximately 100,000–350,000 pixels. Thus, the resulting images are not satisfactory.

Also, with imaging elements such as CCDs, a microlens can be disposed on the surface of the imaging element in order to use light efficiently. As a result, vignetting takes place if the angle of incoming light is too large, thereby preventing light from entering the imaging element. In order to overcome this problem, these conventional photographing lenses have generally provided an adequate distance between the exit pupil and the image plane, thus improving telecentricity by keeping the angle at which light enters the imaging element, i.e., the exit angle, small (for example, see Japanese Laid-Open Patent Document Number Hei 2000-171697, Japanese Laid-Open Patent Document Number Hei 2001-133684, Japanese Laid-Open Patent Document Number Hei 2002-98888, Japanese Laid-Open Patent Document Number Hei 2002-162561, Japanese Laid-Open Patent Document Number Hei 05-40220, Japanese Laid-Open Patent Document Number Hei 05-157962).

With recent significant technical developments in imaging elements, there has been a demand for more compact, thinner, more inexpensive photographing lenses with higher resolutions. With conventional imaging lenses, however, the need to improve telecentricity has resulted in relatively longer total lens lengths, thus preventing these lenses from achieving a thin design.

While the restrictions imposed by the exit angle of light rays have prevented the conventional imaging lenses from being thinner (i.e., having a shorter total lens system length), innovations in microlenses have made it possible to use exit angles of up to around 20°. As a result, there is a demand for a thinner photographing lens suited for an imaging element that uses this type of microlens.

SUMMARY OF THE INVENTION

The object of the present invention is to overcome the problems described above and to provide a photographing lens that can eliminate vignetting; that is formed from a small number of lenses; that is compact, thin, light, and inexpensive; and that is suitable for recent high-density imaging elements mounted in cameras in mobile devices such as portable telephones and portable information terminals, digital still cameras, and digital video cameras.

A photographing lens according to the present invention includes, in sequence from an object side to an image plane side, an aperture stop with a predetermined aperture, a first lens group with an overall positive refractive power, a second lens group with an overall positive refractive power, and a third lens group with an overall positive refractive power. The first lens group is a cemented lens formed by bonding, starting from the object side, a first lens with a positive refractive power and a second lens with a negative refractive power. The second lens group is a third lens with a positive refractive power and an aspherical surface on an object-side surface and/or an image plane side surface. The third lens group is a fourth lens with a positive refractive power and an aspherical surface on an object-side surface and/or an image plane side surface.

With this structure, it is possible to provide a thin photographing lens with a small total lens length that is suitable for high-density imaging elements, that has a light exit angle of no more than 24°, and that effectively corrects various types of aberration such as spherical aberration, astigmatism, distortion, and lateral chromatic aberration.

According to an embodiment, the present invention provides a photographing lens as described above wherein:

$$f/FL > 0.6, \quad (1)$$

where f is a focal length of the total lens system and FL is a distance from an object-side surface of the aperture stop to the image plane at which an object is imaged.

By defining the relationship between the focal length of the total lens system and the dimension along the optical axis of the total lens system as shown in Equation 1, the photographing lens can have a compact, thin design.

According to another embodiment, the present invention provides a photographing lens as described above wherein:

$$10 < v1 - v2 < 25, \text{ and} \quad (2)$$

$$N1 > 1.6, \quad (3)$$

where v1 is an Abbe number of the first lens, v2 is an Abbe number of the second lens, and N1 is a refractive index of the first lens.

By defining the relationship between the Abbe numbers of the first lens and the second lens in the first lens group as shown in Equation 2, chromatic aberration can be effectively corrected. Also, by defining the refractive index of the first lens of the first lens group as shown in Equation 3, the radius of curvature of the first lens is prevented from becoming too small, thus making the lens easier to process.

According to another embodiment, the present invention provides a photographing lens as described above wherein the third lens is a meniscus lens with a convex surface oriented toward an image plane side.

With this structure, an appropriate back focus can be maintained while various types of aberrations, especially astigmatism, can be effectively corrected.

According to another embodiment, the present invention provides a photographing lens as described above wherein the fourth lens is a meniscus lens with a convex surface oriented toward an object side.

With this structure, an appropriate back focus can be maintained while various types of aberrations, especially astigmatism, can be effectively corrected.

According to another embodiment, the present invention provides a photographing lens as described above wherein:

$$1 < R6/R7 < 2, \text{ and} \quad (4)$$

$$1 < R9/R8 < 2, \quad (5)$$

where R6 is a radius of curvature of an object-side surface of the third lens, R7 is a radius of curvature of an image plane side surface of the third lens, R8 is a radius of curvature of an object-side surface of the fourth lens, and R9 is a radius of curvature of an image plane side surface of the fourth lens.

With this structure, the radius of curvature of the third lens is formed to meet Equation 4, and the radius of curvature of the fourth lens is formed to meet Equation 5, thus maintaining an appropriate back focus while effectively correcting various types of aberration, especially astigmatism.

According to another embodiment, the present invention provides a photographing lens as described above wherein an aspherical surface of the fourth lens contains an inflection point.

With this structure, the center and the periphery of the image plane can be easily matched, thus providing effective correction of various types of aberration, especially astigmatism and distortion, while also keeping the exit angle small.

According to another embodiment, the present invention provides a photographing lens as described above wherein the third lens and the fourth lens are formed from a resin material.

With this structure, production costs can be reduced and the structure can be made lighter by using a resin material. Also, since the use of resin material involves injection molding, difficult shapes such as inflection points can be formed easily.

The above, and other objects, features and advantages of the present invention will become apparent from the following description read in conjunction with the accompanying drawings, in which like reference numerals designate the same elements.

BRIEF DESCRIPTION OF THE DRAWINGS

The foregoing and other features of the present invention will be more readily apparent from the following detailed description and drawings of the illustrative embodiments of the invention wherein like reference numbers refer to similar elements and in which.

LIST OF DESIGNATORS

Figure 1:
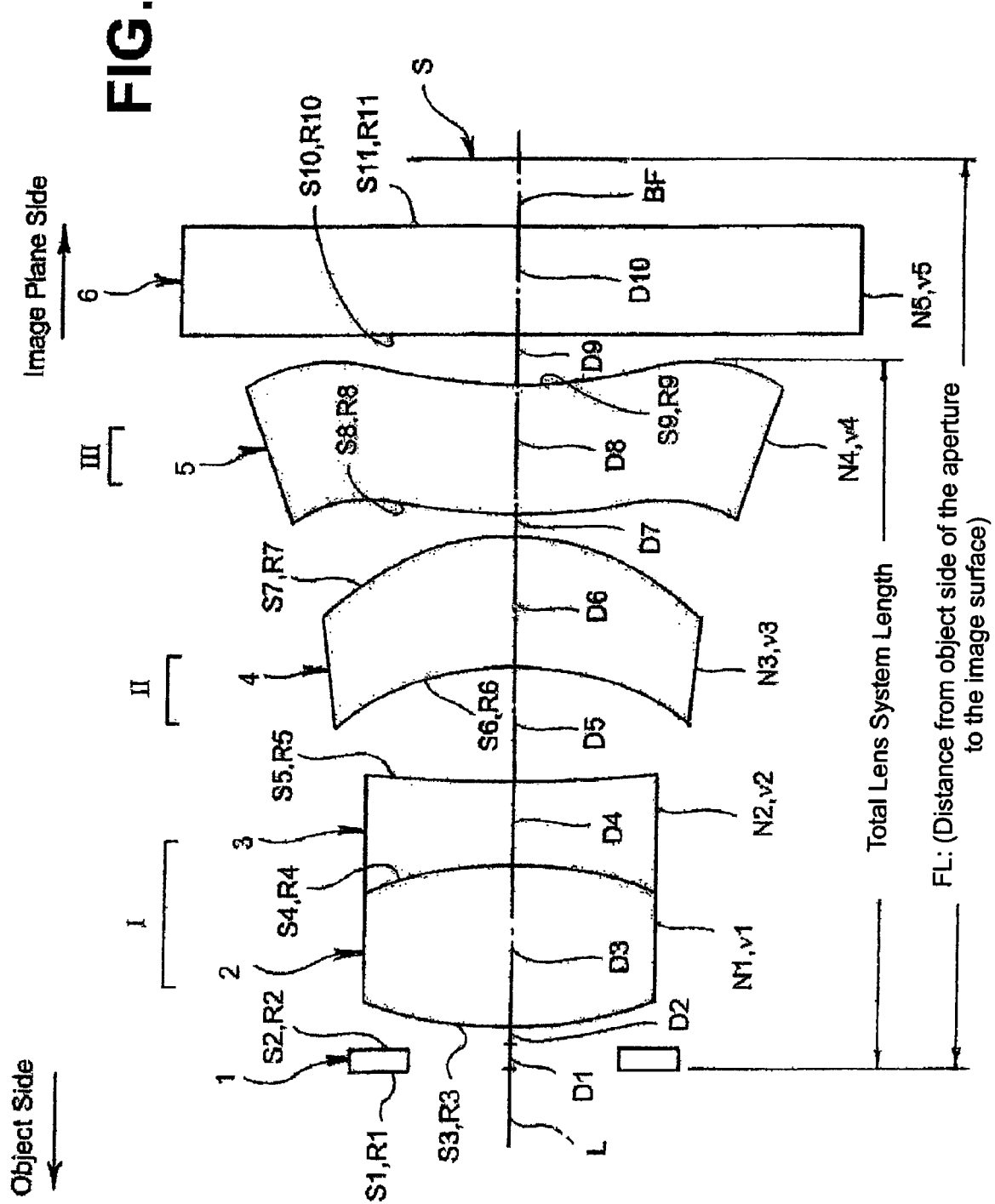
FIG. 1 is a drawing showing the structure of an embodiment of a photographing lens according to the present invention.

I: first lens group
II: second lens group
III: third lens group
1: aperture stop
2: first lens
3: second lens
4, 4': third lens
5: fourth lens
6: glass filter
D1–D10: distances along optical axis
R1–R11: radii of curvature
S1–S11: surfaces
L: optical axis

DETAILED DESCRIPTION OF THE PREFERRED EMBODIMENTS

The embodiments of the present invention will be described, with references to the attached drawings.

FIG. 1 is a drawing showing the basic structure of an embodiment of a photographing lens according to the present invention. In the photographing lens according to this embodiment as shown in FIG. 1, the following elements are arranged, going from object side to image plane side: an aperture stop 1 having a predetermined aperture; a first lens group I having a positive overall refractive power; a second lens group II having a positive overall refractive power; and a third lens group III having a positive overall refractive power.

The first lens group I is formed as a cemented lens in which are bonded, started from the object side: a first lens 2, which is a double-convex lens having a positive refractive power, and a second lens 3, which is a double-concave lens having a negative refractive power. The second lens group II is formed from a single third lens 4 having a positive refractive power and having an aspherical surface on the object side and/or the image plane side. The third lens group III is formed from a single fourth lens 5 having a positive refractive power and an aspherical surface on the object side and/or the image plane side.

In this arrangement, a glass filter 6 is disposed on the image plane side of the fourth lens 5 and is formed as a parallel plate serving as an infrared cutting filter and a low-pass filter. Behind the glass filter 6, there is disposed an image plane S of the CCD.

As shown in FIG. 1, with the arrangement of the aperture stop 1, the first lens 2, the second lens 3, the third lens 4, the fourth lens 5, and the glass filter 6, the surfaces of the aperture stop 1, the lenses 2–5, and the glass filter 6 are labeled Si (i=1–11), the radii of curvature of surfaces Si are labeled Ri (i=1–11), the refractive indexes of the first lens 2 through the fourth lens 5 relative to the d line are represented as Ni(i=1–4), and the Abbe numbers are represented as vi (i=1–4). The refractive index of the glass filter 6 relative to the d line is represented as N5, and the Abbe number of the glass filter 6 is represented as v5. Furthermore, the distances (thicknesses and air distances) along the optical axis L between the aperture stop 1 and the glass filter 6 are represented as Di(i=1–10).

The arrangement is set up so that the following condition Equation 1 is fulfilled:

$$f/FL > 0.6, \quad (1)$$

where the focal length of the total lens system is f and the distance from the object-side front surface S1 of the aperture stop 1 to the image plane S where imaging of the object takes place is FL.

Equation 1 defines an appropriate ratio between the focal length of the total lens system and the dimension along the optical axis of the total lens system and is therefore a condition relating to the thinness of the lens. By forming the structure so that f/FL exceeds 0.6, a compact, thin design can be easily achieved.

The first lens 2 and the second lens 3 of the first lens group I are formed from a glass material and are bonded (adhered) integrally at the surface S4, formed with the single radius of curvature R4. If a single lens were substituted for the first lens 2 and the second lens 3, chromatic aberration would be difficult to correct. However, by making the first lens 2 and the second lens 3 separately and then bonding them integrally, chromatic aberration, which affects higher resolutions, can be easily corrected. Since centering can be performed separately, the lens becomes easier to process.

In the first lens 2 and the second lens 3, the Abbe numbers v1, v2, and the index of refraction N1 fulfill Equations 2 and 3, below:

$$10 < v1-v2 < 25, \text{ and} \qquad (2)$$

$$N1 > 1.6. \qquad (3)$$

Equation 2 defines an appropriate range for Abbe numbers v1, v2 in the first lens group I. Chromatic aberration is difficult to correct and desired optical properties cannot be obtained if the value of v1−v2 is outside of this range, i.e., less than 10 or greater than 25. Thus, by meeting this condition, chromatic aberration can be effectively corrected.

Equation 3 defines the suitable index of refraction N1 for the first lens 2. If the value of N1 is not greater than 1.6, the radius of curvature of the first lens 2 is small and processing becomes difficult. Thus, by meeting this condition, the radius of curvature of the first lens 2 is prevented from becoming too small so that the lens can be easily processed.

The third lens 4 in the second lens group II is a meniscus lens with the convex side facing the image plane side. In this embodiment, the third lens 4 is formed from a resin material. Also, the surface S6 and/or S7 of the third lens 4 is formed as an aspherical surface. In the embodiment of the present invention shown in FIGS. 1 and 2 and described later, the surfaces S6, S7 on both the object side and the image plane side are formed as aspherical surfaces, and in the embodiment of the present invention shown in FIGS. 3 and 4 and described later, only the surface S6 on the object side is formed as an aspherical surface.

As a result, an appropriate back focus can be maintained, and astigmatism and other aberrations can be corrected effectively.

Figure 3:
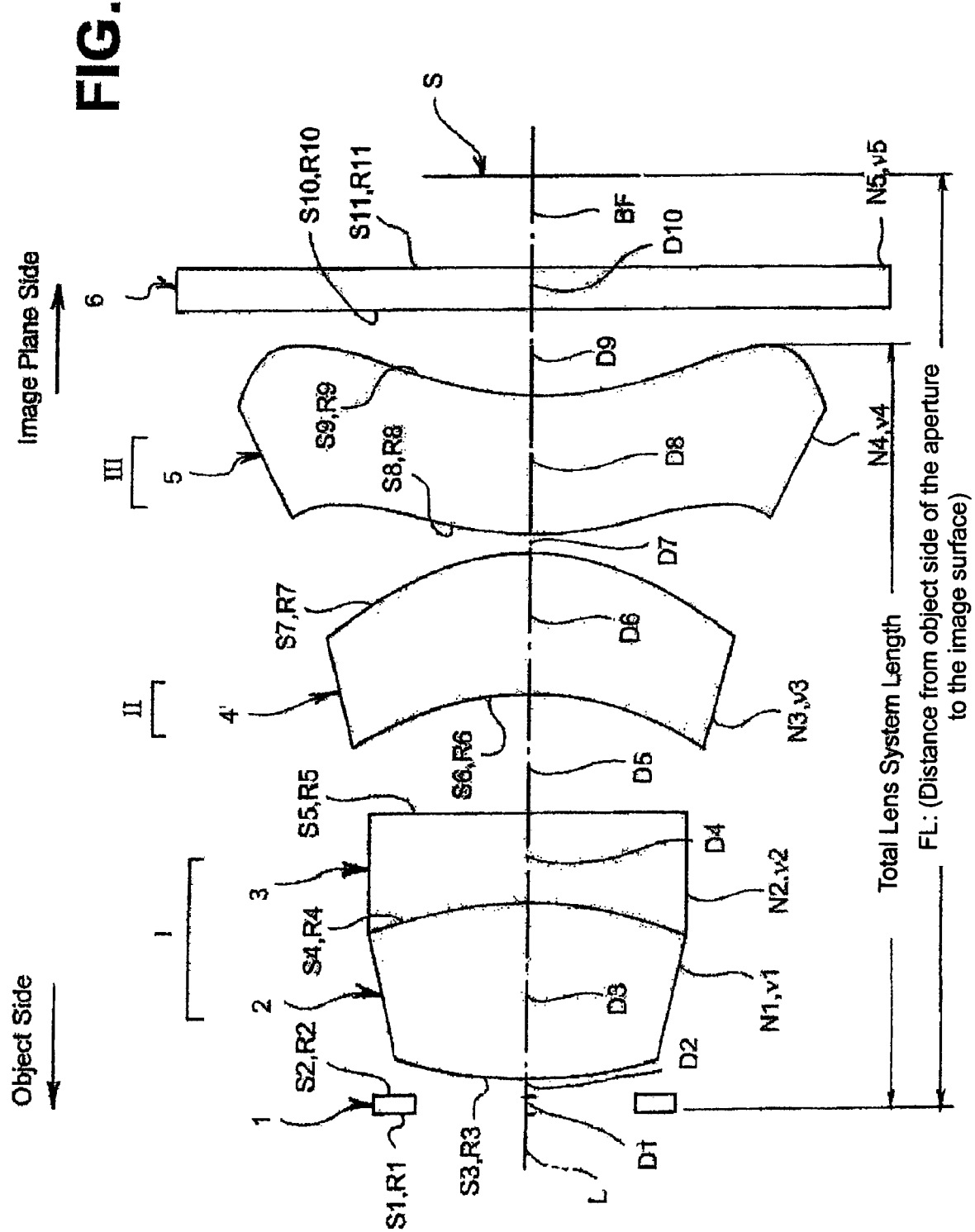
FIG. 3 is a drawing showing the structure of a photographing lens according to another embodiment of the present invention.

The fourth lens 5 of the third lens group III is a meniscus lens with the convex surface pointing toward the object side. In this embodiment, the fourth lens 5 is formed from a resin material. Also, the surface S8 and/or S9 of the fourth lens 5 is formed as an aspherical surface. Furthermore, the fourth lens 5 is formed so that the aspherical surface is formed with an inflection point (changing from concave to convex or from convex to concave). In the embodiments of FIGS. 1 and 3 and described later, the surfaces S8, S9 on both the object side and the image plane side of the fourth lens 5 are formed as aspherical surfaces and are formed with inflection points positioned between the center and a radially outward position.

As a result, an appropriate back focus can be provided and astigmatism and other types of aberration can be effectively corrected. Also, by using a shape with an inflection point, the exit angle can be kept small, thus allowing the center and peripheral image plane to be easily matched.

The equation representing the aspherical surface is as follows:

$$Z = Cy^2/[1+(1-\epsilon C^2 y^2)^{1/2}] + Dy^4 + Ey^6 + Fy^8 + Gy^{10} + Hy^{12}$$

where Z is the distance from the tangent plane at the apex of the aspherical surface to a point on the aspherical surface with height y from the optical axis L, y is the height from the optical axis L, C is the curvature 1/R of the apex of the aspherical surface, $\epsilon$ is the conic constant, and D, E, F, G, H are aspherical surface coefficients.

With the structure described above, in the third lens 4 of the second lens group (II) and the fourth lens 5 of the third lens group III, the following Equations 4 and 5 are fulfilled:

$$1 < R6/R7 < 2, \text{ and} \qquad (4)$$

$$1 < R9/R8 < 2, \qquad (5)$$

where R6, R7 are the radii of curvature of the third lens 4 and R8, R9 are the radii of curvature of the fourth lens 5.

Equations 4 and 5 define lens curvature radius ratios suitable for achieving good optical properties for the third lens 4 and the fourth lens 5. If these conditions are not met, an appropriate back focus is difficult to maintain, and the correction of various types of aberration, particularly astigmatism and distortion, becomes difficult. Thus, by meeting these conditions, an appropriate back focus can be maintained, and various aberrations can be corrected, thereby providing suitable optical properties.

Figure 2:
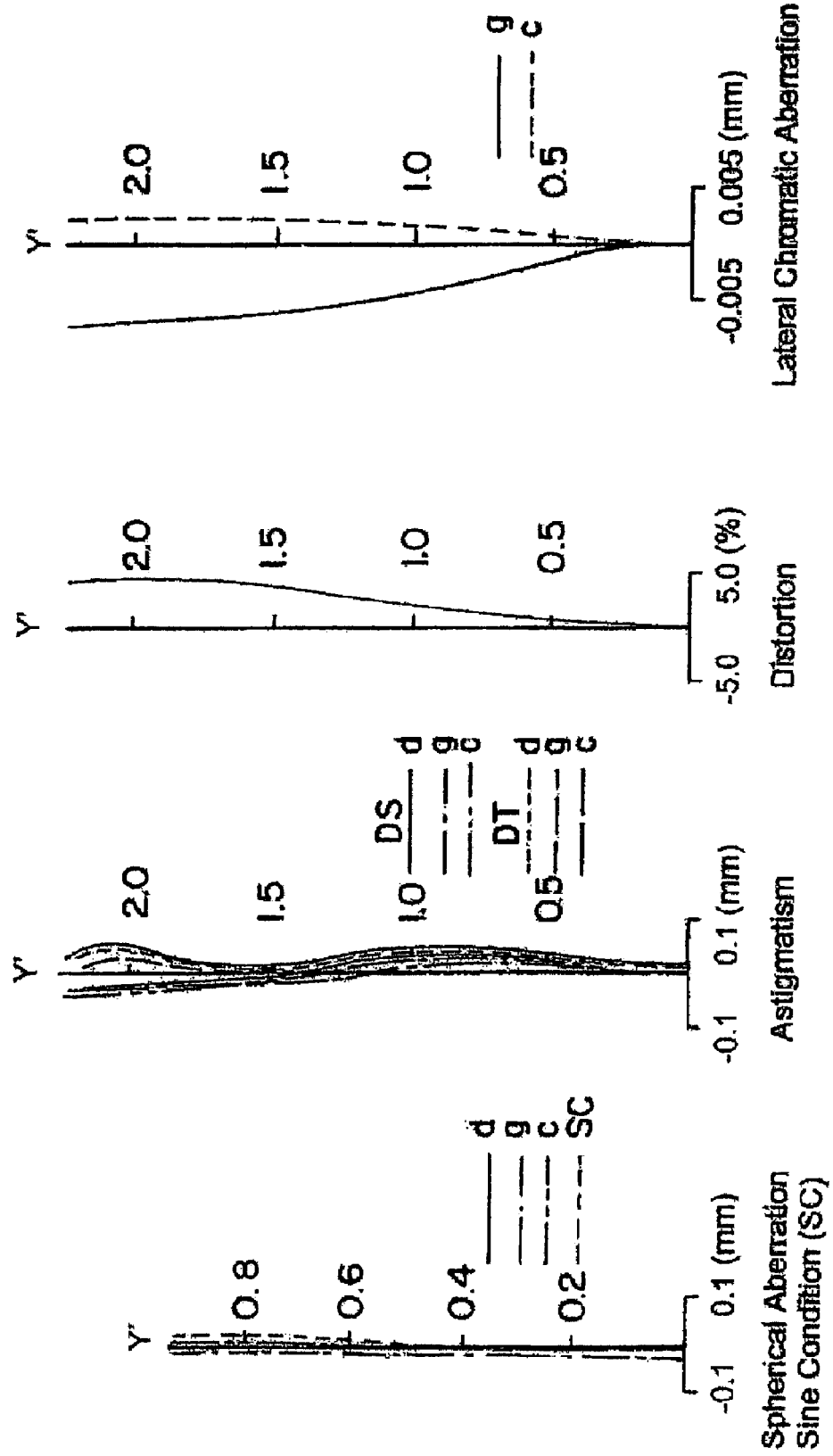
FIG. 2 shows aberration charts of spherical aberration, astigmatism, distortion, and lateral chromatic aberration for the photographing lens of FIG. 1.

An embodiment based on specific numerical values for the structure described above and shown in FIG. 1 will be described. The main specifications of this embodiment are shown in Table 1. Table 2 shows the various numerical data (settings). Table 3 shows numerical data relating to the aspherical surfaces. FIG. 2 shows aberration charts indicating spherical aberration, astigmatism, distortion, and lateral chromatic aberration of this embodiment. In FIG. 2, "d" is the aberration due to "d" line, "g" is the aberration due to "g" line, and "c" is the aberration due to "c" line. SC is the offense against the sine condition, DS is the sagittal plane aberration, and DT is the meridional plane aberration.

TABLE 1

| Object Distance | Infinity (∞) | Total Lens System Length (Front Surface of Aperture Stop - Back End of Fourth Lens) | 6.410 mm |
|---|---|---|---|
| Focal Length f of Total Lens System | 5.20 mm | Back Focus (Air Conversion) | 1.746 mm |
| F No | 2.80 | Distance FL From Front Surface of Aperture Stop to Image Plane | 8.156 mm |
| Exit Angle (Maximum Value Along Chief Ray) | 16.5° | Angle of View (2 ω) | 45.0° |

TABLE 2

| Surface | Radius of Curvature (mm) | Distance (mm) | Refractive Index (d line) | Abbe Number |
|---|---|---|---|---|
| S1 (Aperture Stop) | R1 ∞ | D1 0.15 | | |

TABLE 2-continued

| Surface | Radius of Curvature (mm) | | Distance (mm) | Refractive Index (d line) | | Abbe Number | |
|---|---|---|---|---|---|---|---|
| S2 | R2 | ∞ (Aperture Stop) | | | | | |
| | | | D2 | 0.20 | | | |
| S3 | R3 | 4.290 | D3 | 1.50 | N1 | 1.80610 | v1 40.7 |
| S4 | R4 | -3.548 | D4 | 0.77 | N2 | 1.80518 | v2 25.5 |
| S5 | R5 | 19.226 | | | | | |
| | | | D5 | 1.10 | | | |
| S6* | R6 | -2.503 | D6 | 1.25 | N3 | 1.50914 | v3 56.4 |
| S7* | R7 | -2.293 | | | | | |
| | | | D7 | 0.20 | | | |
| S8* | R8 | 3.547 | D8 | 1.24 | N4 | 1.50914 | v4 56.4 |
| S9* | R9 | 3.850 | | | | | |
| | | | D9 | 0.50 | | | |
| S10 | | ∞ | D10 | 1.00 | N5 | 1.51680 | v5 64.2 |
| S11 | | ∞ | | | | | |
| | | | BF | 0.587 | | | |

*Aspherical Surface

TABLE 3

| Surface | Aspherical Surface Coefficients | |
|---|---|---|
| S6 | ε | -0.51445864 |
| | D | $-0.3773895 \times 10^{-1}$ |
| | E | $0.2167207 \times 10^{-2}$ |
| | F | $-0.1712381 \times 10^{-3}$ |
| | G | $-0.3739809 \times 10^{-5}$ |
| | H | $0.1238883 \times 10^{-6}$ |
| S7 | ε | 0.0212229 |
| | D | $-0.1629791 \times 10^{-1}$ |
| | E | $-0.2108944 \times 10^{-3}$ |
| | F | $0.1949735 \times 10^{-3}$ |
| | G | $-0.1372312 \times 10^{-4}$ |
| | H | $-0.3778208 \times 10^{-6}$ |
| S8 | ε | -13.4014240 |
| | D | $-0.5056292 \times 10^{-2}$ |
| | E | $-0.2657496 \times 10^{-2}$ |
| | F | $-0.6058138 \times 10^{-3}$ |
| | G | $0.2292696 \times 10^{-5}$ |
| | H | $0.3666578 \times 10^{-6}$ |
| S9 | ε | -6.0183648 |
| | D | $-0.2321751 \times 10^{-3}$ |
| | E | $-0.3355581 \times 10^{-2}$ |
| | F | $-0.5973249 \times 10^{-4}$ |
| | G | $0.1220479 \times 10^{-4}$ |
| | H | $0.1313222 \times 10^{-5}$ |

The values for Equations 1–5 are as follows:

$f/FL = 0.638 \ (0.638 > 0.6)$ (1)

$v1 - v2 = 15.2 \ (10 < 15.2 < 25)$ (2)

$N1 = 1.80610 \ (1.80610 > 1.6)$ (3)

$R6/R7 = 1.092 \ (1 < 1.092 < 2)$ (4)

$R9/R8 = 1.085 \ (1 < 1.085 < 2)$ (5)

Thus, all the conditions are fulfilled.

The embodiment shown in FIGS. 1 and 2 and described above provides a photographing lens with superior optical properties suitable for high pixel densities. A thin (i.e., the dimension along the optical axis is small) design is provided, various aberrations are corrected effectively, the total lens length without the back focus is 6.410 mm, the back focus (air conversion) is 1.746 mm, the exit angle is 16.5°, the F number is 2.80, and the angle of view is 45.0°.

FIG. 3 shows the basic structure of another embodiment of a photographing lens according to the present invention. This photographing lens is similar to that of the embodiment described above except that only the object-side surface S6 of the third lens 4' is formed as an aspherical surface and various lens specifications are changed.

Figure 4:
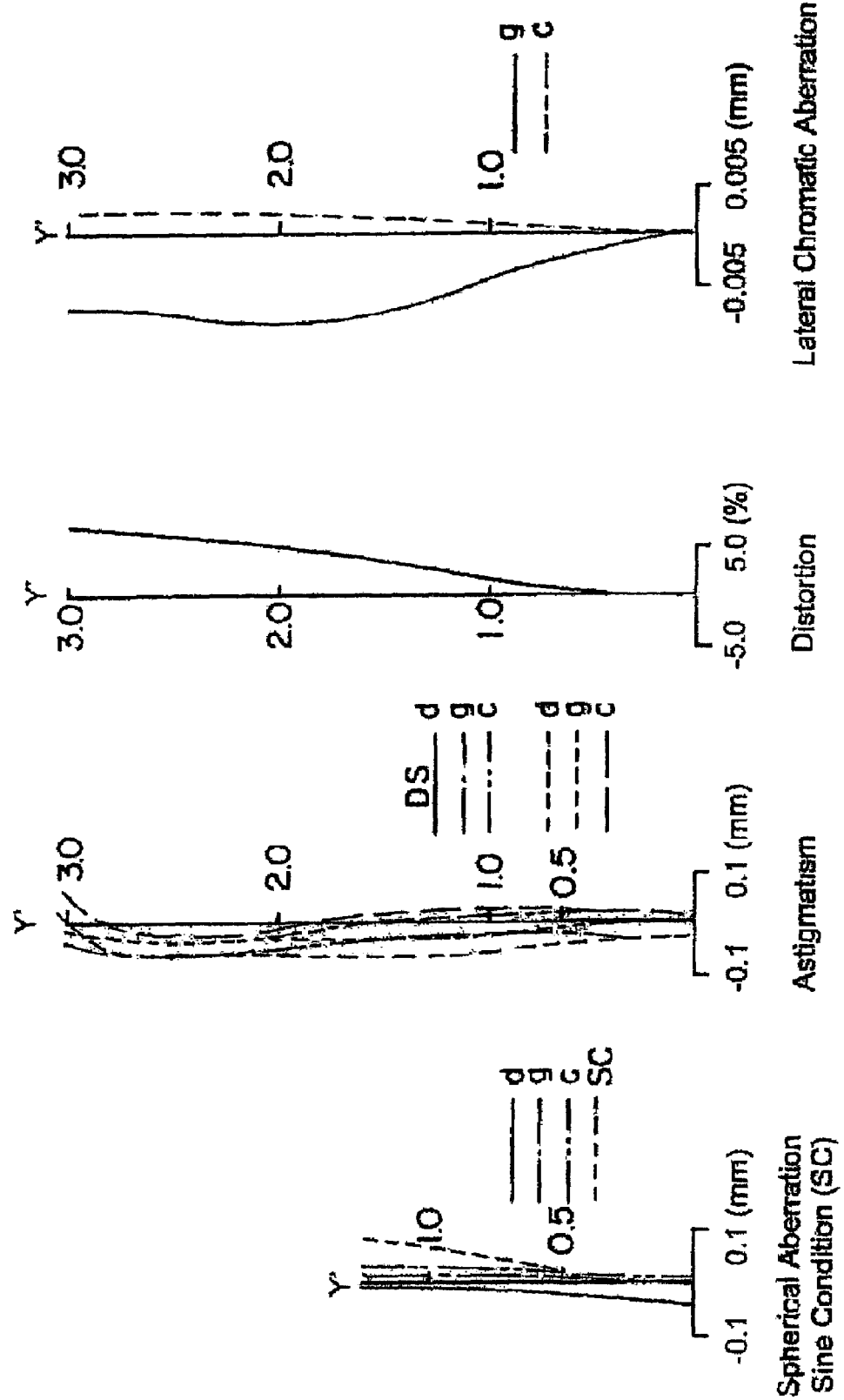
FIG. 4 shows aberration charts of spherical aberration, astigmatism, distortion, and lateral chromatic aberration for the photographing lens of FIG. 3.

This embodiment is based on the specific numerical values described here. The main specifications of this embodiment are shown in Table 4. Table 5 shows various numerical data (settings). Table 6 shows numerical data relating to aspherical surfaces. FIG. 4 shows aberration charts indicating spherical aberration, astigmatism, distortion, and lateral chromatic aberration in embodiment 1. In FIG. 4, "d" is the aberration due to "d" line, "g" is the aberration due to "g" line, and "c" is the aberration due to "c" line. SC is the offense against the sine condition, DS is the sagittal plane aberration, and DT is the meridional plane aberration.

TABLE 4

| Object Distance | Infinity (∞) | Total Lens System Length (Front Surface of Aperture Stop - Back End of Fourth Lens) | 8.440 mm |
|---|---|---|---|
| Focal Length f of Total Lens System | 7.00 mm | Back Focus (Air Conversion) | 2.435 mm |
| F No | 2.80 | Distance FL From Front Surface of Aperture Stop to Image Plane | 10.875 mm |
| Exit Angle (Maximum Value Along Chief Ray) | 21.4° | Angle of View (2 ω) | 43.7° |

TABLE 5

| Surface | Radius of Curvature (mm) | | Distance (mm) | Refractive Index (d line) | | Abbe Number | |
|---|---|---|---|---|---|---|---|
| S1 | R1 | ∞ (Aperture Stop) | D1 | 0.15 | | | |
| S2 | R2 | ∞ (Aperture Stop) | | | | | |
| | | | D2 | 0.20 | | | |
| S3 | R3 | 6.187 | D3 | 2.00 | N1 | 1.83400 | v1 37.3 |
| S4 | R4 | -4.758 | D4 | 1.00 | N2 | 1.84666 | v2 23.8 |
| S5 | R5 | 46.913 | | | | | |
| | | | D5 | 1.48 | | | |
| S6* | R6 | -3.161 | D6 | 1.68 | N3 | 1.50914 | v3 56.4 |
| S7* | R7 | -3.096 | | | | | |
| | | | D7 | 0.26 | | | |
| S8* | R8 | 4.125 | D8 | 1.67 | N4 | 1.50914 | v4 56.4 |
| S9* | R9 | 4.218 | | | | | |
| | | | D9 | 1.00 | | | |
| S10 | | ∞ | D10 | 0.50 | N5 | 1.51680 | v5 64.2 |
| S11 | | ∞ | | | | | |
| | | | BF | 1.105 | | | |

*Aspherical Surface

TABLE 6

| Surface | Aspherical Surface Coefficients | |
|---|---|---|
| S6 | ε | -5.1406894 |
| | D | $-0.1842411 \times 10^{-1}$ |
| | E | $0.1430406 \times 10^{-2}$ |
| | F | $-0.6253182 \times 10^{-4}$ |
| | G | $-0.2576304 \times 10^{-6}$ |
| | H | $-0.2119445 \times 10^{-6}$ |
| S8 | ε | -16.3437272 |
| | D | $0.1787683 \times 10^{-1}$ |
| | E | $-0.5224963 \times 10^{-2}$ |
| | F | $0.3504123 \times 10^{-3}$ |
| | G | $0.3626451 \times 10^{-5}$ |

TABLE 6-continued

| Surface | Aspherical Surface Coefficients | |
|---|---|---|
| | H | $-0.1939507 \times 10^{-5}$ |
| S9 | $\epsilon$ | $-6.0182006$ |
| | D | $0.1992966 \times 10^{-1}$ |
| | E | $-0.4456463 \times 10^{-2}$ |
| | F | $0.1046913 \times 10^{-3}$ |
| | G | $0.4122121 \times 10^{-4}$ |
| | H | $-0.3233493 \times 10^{-5}$ |

The values for Equations 1–5 are as follows:

$$f/FL=0.644\ (0.644>0.6) \tag{1}$$

$$v1-v2=13.5\ (10<13.5<25) \tag{2}$$

$$N1=1.83400\ (1.83400>1.6) \tag{3}$$

$$R6/R7=1.021\ (1<1.021<2) \tag{4}$$

$$R9/R8=1.023\ (1<1.023<2) \tag{5}$$

Thus, all the conditions are fulfilled.

The embodiment shown in FIGS. 3 and 4 and described above provides a photographing lens with superior optical properties suitable for high pixel densities. A thin (i.e., the dimension along the optical axis is small) design is provided, various aberrations are corrected effectively, the total lens length without the back focus is 8.440 mm, the back focus (air conversion) is 2.435 mm, the exit angle is 21.4°, the F number is 2.80, and the angle of view is 43.7°.

With a photographing lens according to the present invention as described above, a thin photographing lens can be provided that eliminates vignetting in the imaging element, that requires a small number of structural elements while keeping the design compact, thin, and inexpensive, and that corrects various types of aberration effectively.

More specifically, a thin photographing lens suitable for high-density imaging elements is provided wherein the light exit angle is kept to equal to or less than 24°, the total lens length is kept to a short dimension of no more than 9 mm (not including back focus) while maintaining an appropriate back focus, and various types of aberration are corrected effectively.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A photographing lens comprising a total lens system comprising, in sequence from the object side to the image plane side:
   an aperture stop with a predetermined aperture;
   a first lens group with an overall positive refractive power;
   a second lens group with an overall positive refractive power; and
   a third lens group with an overall positive refractive power; wherein:
   said first lens group is a cemented lens formed by bonding, in sequence from said object side to said image plane side, a first lens with a positive refractive power and a second lens with a negative refractive power;
   said second lens group is a third lens with a positive refractive power and an aspherical surface on at least one of an object-side surface and an image plane side surface; and
   said third lens group is a fourth lens with a positive refractive power and an aspherical surface on at least one of an object-side surface and an image plane side surface.

2. The photographing lens as described in claim 1, wherein:

$$f/FL>0.6, \tag{1}$$

where f is a focal length of said total lens system and FL is a distance from an object-side surface of said aperture stop to said image plane on which an object is imaged.

3. The photographing lens as described in claim 2, wherein:

$$10<v1-v2<25,\ \text{and} \tag{4}$$

$$N1>1.6, \tag{5}$$

where v1 is an Abbe number of said first lens, v2 is an Abbe number of said second lens, and N1 is a refractive index of said first lens.

4. The photographing lens as described in claim 2, wherein said third lens is a meniscus lens with a convex surface oriented toward said image plane side.

5. The photographing lens as described in claim 2, wherein said fourth lens is a meniscus lens with a convex surface oriented toward said object side.

6. The photographing lens as described in claim 2, wherein:

$$1<R6/R7<2,\ \text{and} \tag{4}$$

$$1<R9/R8<2, \tag{5}$$

where R6 is a radius of curvature of said object-side surface of said third lens, R7 is a radius of curvature of said image plane side surface of said third lens, R8 is a radius of curvature of said object-side surface of said fourth lens, and R9 is a radius of curvature of said image plane side surface of said fourth lens.

7. The photographing lens as described in claim 2, wherein said aspherical surface of said fourth lens comprises an inflection point.

8. The photographing lens as described in claim 2, wherein said third lens and said fourth lens are formed from a resin material.

9. The photographing lens as described in claim 1, wherein:

$$10<v1-v2<25,\ \text{and} \tag{2}$$

$$N1>1.6, \tag{3}$$

where v1 is an Abbe number of said first lens, v2 is an Abbe number of said second lens, and N1 is a refractive index of said first lens.

10. The photographing lens as described in claim 9, wherein said third lens is a meniscus lens with a convex surface oriented toward said image plane side.

11. The photographing lens as described in claim 9, wherein said fourth lens is a meniscus lens with a convex surface oriented toward said object side.

12. The photographing lens as described in claim 9, wherein:

$$1<R6/R7<2,\ \text{and} \tag{4}$$

$$1<R9/R8<2, \tag{5}$$

where R6 is a radius of curvature of said object-side surface of said third lens, R7 is a radius of curvature of said image plane side surface of said third lens, R8 is a radius of curvature of said object-side surface of said fourth lens, and R9 is a radius of curvature of said image plane side surface of said fourth lens.

13. The photographing lens as described in claim 9, wherein said aspherical surface of said fourth lens comprises an inflection point.

14. The photographing lens as described in claim 9, wherein said third lens and said fourth lens are formed from a resin material.

15. The photographing lens as described in claim 1, wherein said third lens is a meniscus lens with a convex surface oriented toward said image plane side.

16. The photographing lens as described in claim 1, wherein said fourth lens is a meniscus lens with a convex surface oriented toward said object side.

17. The photographing lens as described in claim 1, wherein:

$$1 < R6/R7 < 2, \text{ and} \qquad (4)$$

$$1 < R9/R8 < 2, \qquad (5)$$

where R6 is a radius of curvature of said object-side surface of said third lens, R7 is a radius of curvature of said image plane side surface of said third lens, R8 is a radius of curvature of said object-side surface of said fourth lens, and R9 is a radius of curvature of said image plane side surface of said fourth lens.

18. The photographing lens as described in claim 1, wherein said aspherical surface of said fourth lens comprises an inflection point.

19. The photographing lens as described in claim 1, wherein said third lens and said fourth lens are formed from a resin material.

* * * * *